US009615285B2

(12) United States Patent
Yasumoto

(10) Patent No.: US 9,615,285 B2
(45) Date of Patent: Apr. 4, 2017

(54) SYSTEM, ELECTRONIC DEVICE, METHOD OF COMMUNICATING, AND AND NON-TRANSITORY COMPUTER-READABLE STORAGE MEDIUM

(71) Applicant: FUJITSU LIMITED, Kawasaki-shi, Kanagawa (JP)

(72) Inventor: Tomonori Yasumoto, Kokubunji (JP)

(73) Assignee: FUJITSU LIMITED, Kawasaki (JP)

( * ) Notice: Subject to any disclaimer, the term of this patent is extended or adjusted under 35 U.S.C. 154(b) by 319 days.

(21) Appl. No.: 14/157,395

(22) Filed: Jan. 16, 2014

(65) Prior Publication Data
US 2014/0134986 A1 May 15, 2014

Related U.S. Application Data

(63) Continuation of application No. PCT/JP2011/066343, filed on Jul. 19, 2011.

(51) Int. Cl.
*H04M 3/42* (2006.01)
*H04W 28/02* (2009.01)
(Continued)

(52) U.S. Cl.
CPC ...... *H04W 28/0215* (2013.01); *H04B 1/3816* (2013.01); *H04W 4/003* (2013.01);
(Continued)

(58) Field of Classification Search
CPC ..... H04W 12/06; H04W 12/04; H04W 88/02; H04W 12/08; H04W 84/12; H04W 4/24;
(Continued)

(56) References Cited

U.S. PATENT DOCUMENTS 5,884,168 A    3/1999  Kolev et al.
2004/0142684 A1  7/2004  Ratert et al.
(Continued)

FOREIGN PATENT DOCUMENTS

CN    1864421    11/2006
CN    101742731   6/2010
(Continued)

OTHER PUBLICATIONS

International Search Report dated Oct. 25, 2011 in application No. PCT/JP2011/066343.
(Continued)

*Primary Examiner* — Ajit Patel
(74) *Attorney, Agent, or Firm* — Maschoff Brennan

(57) ABSTRACT

An electronic device includes a first communication unit that communicatively connects to a network using the user information; a second communication unit that communicatively connects to a second electronic device; a determination unit that, upon obtaining data by the first communication unit, determines whether or not the data is to be obtained by the second electronic device, based on the data; a user information transmitter that, when the determination unit determines that the data is to be obtained by the second electronic device, sends the user information to the second electronic device via the second communication unit; and a migration unit that blocks the first communication unit from communicating with the network, and causes the second electronic device to obtain the data through the network using the user information.

15 Claims, 11 Drawing Sheets

(51) Int. Cl.
| | | |
|---|---|---|
| *H04W 8/20* | (2009.01) | |
| *H04W 8/18* | (2009.01) | |
| *H04W 88/08* | (2009.01) | |
| *H04W 4/00* | (2009.01) | |
| *H04B 1/3816* | (2015.01) | |
| *H04W 4/24* | (2009.01) | |
| *H04W 12/04* | (2009.01) | |
| *H04W 12/08* | (2009.01) | |

(52) U.S. Cl.
CPC .............. *H04W 4/24* (2013.01); *H04W 8/183* (2013.01); *H04W 8/205* (2013.01); *H04W 12/04* (2013.01); *H04W 12/08* (2013.01); *H04W 88/08* (2013.01)

(58) Field of Classification Search
CPC . H04W 4/003; H04W 4/008; H04W 28/0215; H04W 8/183; H04W 8/205; H04W 88/08; H04B 1/3816
See application file for complete search history.

(56) References Cited

U.S. PATENT DOCUMENTS

| | | |
|---|---|---|
| 2004/0204087 A1 | 10/2004 | Carlsson |
| 2007/0004457 A1 | 1/2007 | Han |
| 2008/0003982 A1 | 1/2008 | Gushiken |
| 2008/0081611 A1* | 4/2008 | Hoyt .................... H04W 8/205 455/425 |
| 2008/0141313 A1 | 6/2008 | Kato et al. |

FOREIGN PATENT DOCUMENTS

| | | |
|---|---|---|
| DE | 10012057 | 9/2001 |
| GB | 2365699 | 2/2002 |
| JP | 2001-505372 A | 4/2001 |
| JP | 2003-324768 A | 11/2003 |
| WO | 98/09462 A1 | 3/1998 |
| WO | 02/089449 | 11/2002 |
| WO | 03/084265 | 10/2003 |
| WO | 2004/021715 A2 | 3/2004 |

OTHER PUBLICATIONS

EESR mailed on May 8, 2015 for corresponding EP Application No. 11869593.1.
Chinese Office Action mailed on Mar. 27, 2015 for corresponding CN Application No. 201180072376.8 Full translation of the Office Action.
Japanese Office Action mailed on Mar. 24, 2015 for corresponding JP Application No. 2013-525444 Partial translation of the relevant part.
CN-OA mailed on Oct. 20, 2015 for corresponding CN Application No. 201180072376.8 Full translation of the OA.
KR-OA mailed on Jul. 31, 2015 for corresponding KR Application No. 10-2014-7003891.
Chinese Office Action mailed on Apr. 13, 2016 in corresponding Chinese Application No. 201180072376.8 with English Translation.
CN-OA (Notification of Reexamination) mailed on Sep. 30, 2016 for corresponding CN Application No. 201180072376.8 Full translation of the OA.

* cited by examiner

SYSTEM, ELECTRONIC DEVICE, METHOD OF COMMUNICATING, AND AND NON-TRANSITORY COMPUTER-READABLE STORAGE MEDIUM

CROSS-REFERENCE TO RELATED APPLICATION

This application is a continuation Application of an International application PCT/JP2011/66343 filed on Jul. 19, 2011, and designated the U.S., the entire contents of which are incorporated herein by reference.

FIELD

The present embodiment relates to a system, an electronic device, a method of communicating, and a computer-readable storage medium having a communication program stored therein.

BACKGROUND

Information terminals, such as a mobile phone and a personal computer (PC), which communicate in a wireless wide area network (hereinafter referred to as "wireless WAN"), e.g., mobile telephone network, have subscriber identity module (hereinafter, referred to as "SIM") cards mounted thereto.

Such SIM cards are storage supplied by wireless WAN communication operators, and are used while being mounted on information terminals, e.g., mobile phones. A SIM card has information about a subscriber of a communication operator, stored therein. A unique number, known as an international mobile subscriber identity (IMSI, hereinafter referred to as "SIM information"), is assigned to a single SIM card, and the IMSI is related to a telephone number. When a SIM card is inserted into a SIM card slot in an information terminal, the information terminal can perform voice calls and data communications and use services provided by the communication operator. Conversely speaking, unless a user possesses a SIM card and inserts it into an electronic device, the user is not able to perform voice calls and data communications or use the services provided by the communication operator, on that electronic device.

By detaching and inserting a SIM card from and to information terminals, a telephone number can be migrated between information terminals. Further, by using multiple SIM cards, multiple telephone numbers can be used on a single information terminal.

A single telephone number is related to a SIM card, a basic fee for an information terminal and charges for voice calls and data communication service are charged for each SIM card.

Patent Reference 1: Japanese National Publication of International Patent Application No. 2001-505372

In conventional information terminals, for using a single SIM card on multiple information terminals, the SIM card is required to be detached from one information terminal and then inserted to another information terminal.

A single piece of SIM information is related to a single SIM card. Hence, once a SIM card is inserted to an information terminal, that SIM card cannot be used in another information terminal. Accordingly, for using one SIM card on multiple information terminals, detachment and insertion of that SIM card is required. The procedure for switching a connection between information terminals is quite cumbersome.

Since time delay is caused by a reconnection during switching between information terminals, a seamless provision of services is not possible.

Since each information terminal has its own SIM card, respective communication services are provided on these information terminals. Hence, in some cases, a basic fee is charged for each information terminal (i.e., for each SIM card).

SUMMARY

According to an aspect of the embodiments, a system includes: a first electronic device; and a second electronic device, the first electronic device including: a first communication unit that communicatively connects to a network using the user information; a second communication unit that communicatively connects to the second electronic device; a determination unit that, upon obtaining data by the first communication unit, determines whether or not the data is to be obtained by the second electronic device, based on the data; a user information transmitter that, when the determination unit determines that the data is to be obtained by the second electronic device, sends the user information to the second electronic device via the second communication unit; and a migration unit that blocks the first communication unit from communicating with the network, and causes the second electronic device to obtain the data through the network using the user information, the second electronic device including: a third communication unit that communicatively connects to the network using the user information; a fourth communication unit that communicatively connects to the first electronic device; a user information receiver that receives the user information sent by the user information transmitter; and a reception processor that obtains the data through the network using the user information.

Additionally, an electronic device includes: a first communication unit that communicatively connects to a network using the user information; a second communication unit that communicatively connects to a second electronic device; a determination unit that, upon obtaining data by the first communication unit, determines whether or not the data is to be obtained by the second electronic device, based on the data; a user information transmitter that, when the determination unit determines that the data is to be obtained by the second electronic device, sends the user information to the second electronic device via the second communication unit; and a migration unit that blocks the first communication unit from communicating with the network, and causes the second electronic device to obtain the data through the network using the user information.

Additionally, an electronic device includes: a third communication unit that communicatively connects to a network using the user information; a fourth communication unit that communicatively connects to a first electronic device; a user information receiver that receives the user information received from the first electronic device; and a reception processor that obtains data through the network using the user information.

Furthermore, a method of communicating in a system including a first electronic device and a second electronic device, the method includes: obtaining data by the first electronic device from a network using the user information; upon obtaining the data, determining whether or not the data is to be received by the second electronic device, based on the data; when it is determined that the data is to be obtained by the second electronic device, sending the user information from the first electronic device to the second electronic device; and blocking the first communication unit from communicating with the network, and causing the second electronic device to obtain the data through the network using the user information.

Furthermore, a computer-readable storage medium having a communication program stored therein, the communication program, when executed by an electronic device, causes the electronic device to: communicatively connect to a network using the user information; upon obtaining data through the network, determine whether or not the data is to be received by the second electronic device, based on the data; when it is determined that the data is to be obtained by the second electronic device, send the user information to the second electronic device; and block the electronic device from communicating with the network, and causes the second electronic device to obtain the data through the network using the user information.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

A. Embodiment

Hereunder is a description of embodiments with reference to the drawings.

Figure 1:
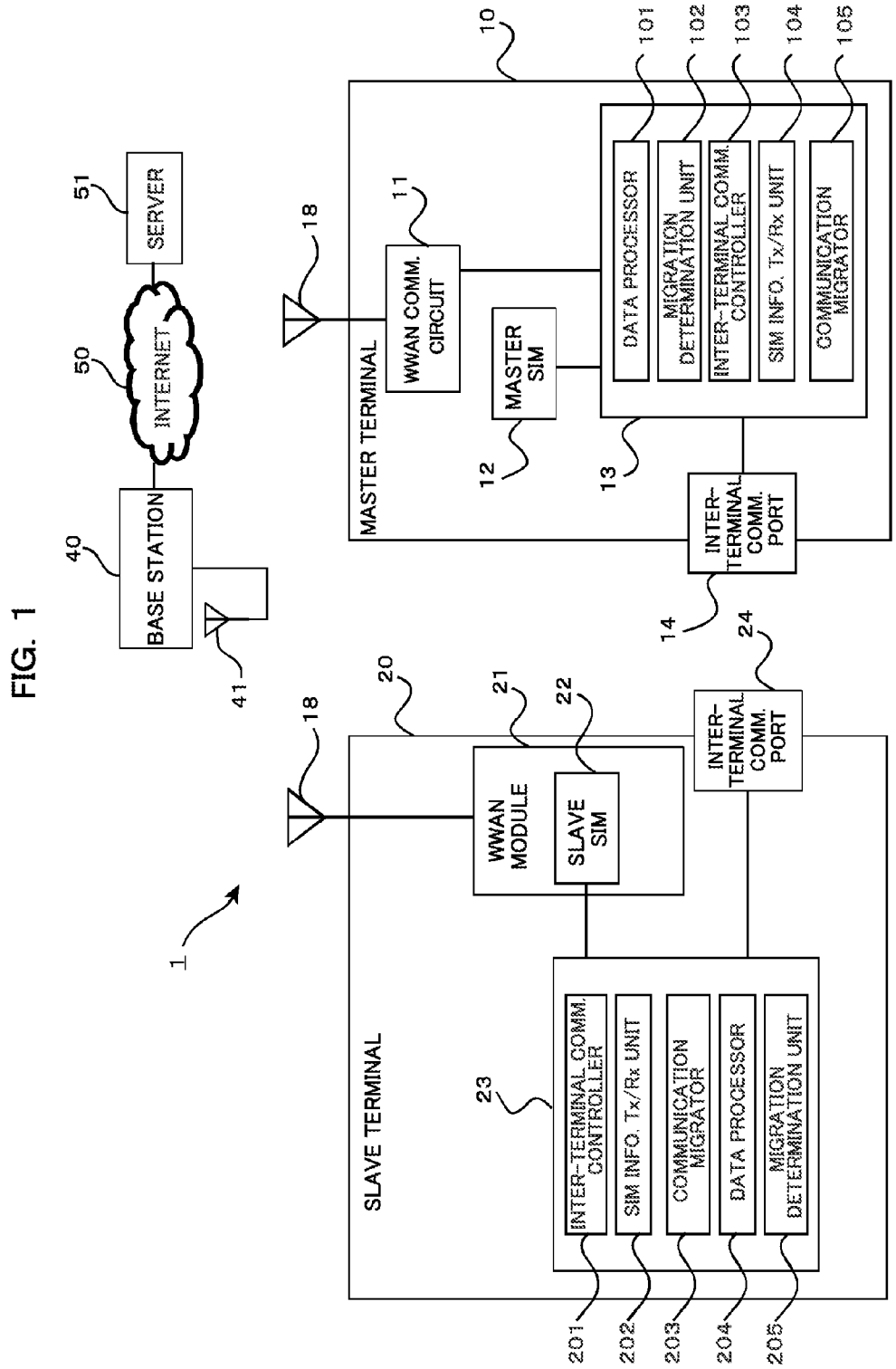
FIG. 1 is a functional block diagram of a system as an example of an embodiment.
Figure 2:
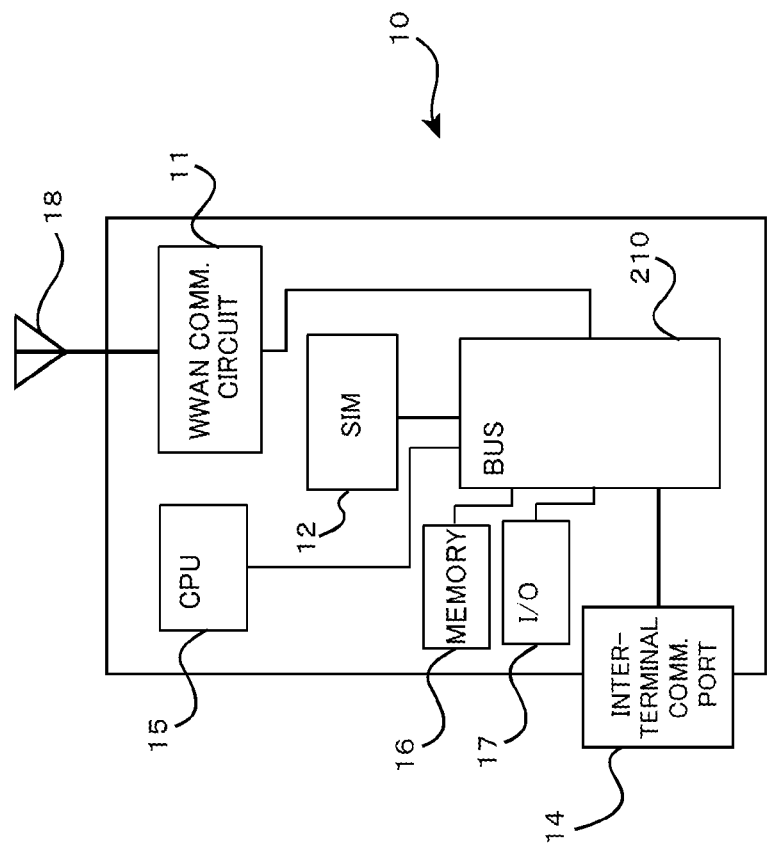
FIG. 2 is a schematic diagram illustrating a hardware configuration of a mobile phone as a master terminal as an example of an embodiment.
Figure 3:
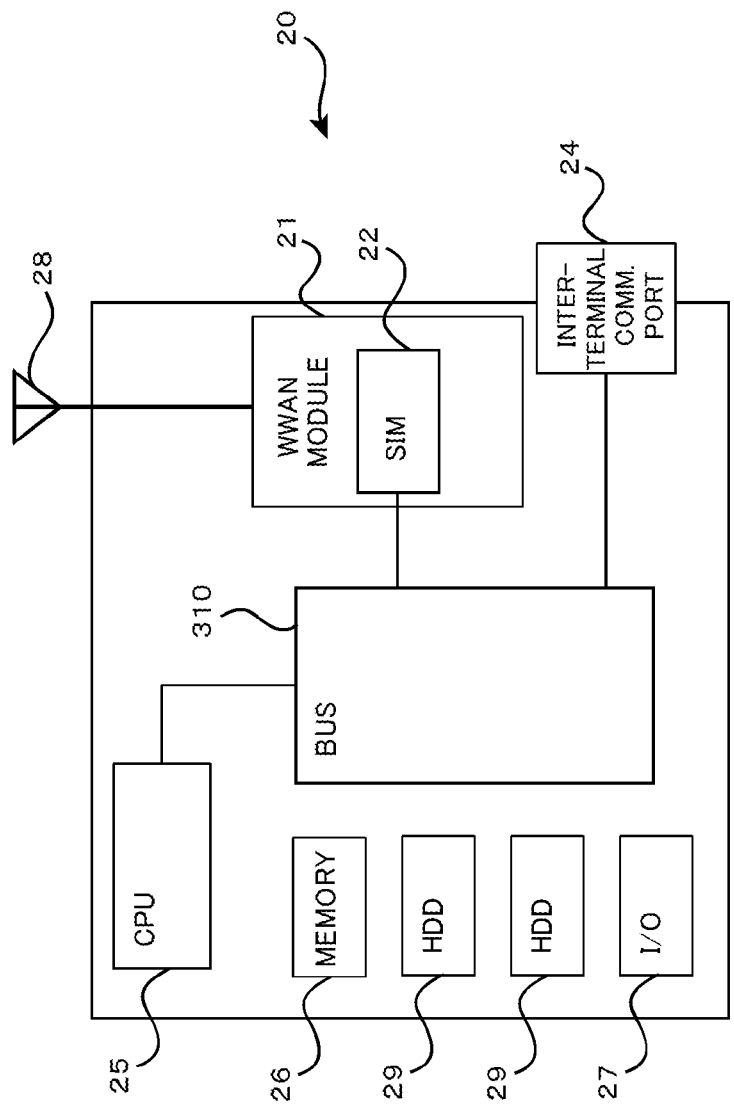
FIG. 3 is a schematic diagram illustrating a hardware configuration of a PC as a slave terminal as an example of an embodiment.

FIG. 1 is a functional block diagram of a system 1 as an example of an embodiment. FIG. 2 is a schematic diagram illustrating a hardware configuration of a mobile phone 10 as a master terminal as an example of an embodiment. FIG. 3 is a schematic diagram illustrating a hardware configuration of a PC 20 as a slave terminal as an example of an embodiment.

In the example depicted in FIG. 1, the system 1 includes a terminal (information terminal; electronic device; first electronic device) 10 having a SIM card mounted therein and performing a wireless WAN communication, a terminal (information terminal; electronic device; second electronic device) 20 having a SIM card mounted therein and performing a wireless WAN communication, and a wireless WAN base station 40.

In the present embodiment, SIM card information in the SIM card in the terminal 10 is duplicated to the terminal 20 through an inter-terminal wireless communication.

Note that hereinafter, a source information terminal from which SIM card information is copied is referred to as a "master terminal", while a destination information terminal to which the SIM card information is copied is referred to as a "slave terminal".

A source SIM card from which the SIM card information is copied is referred to as a "master SIM card", whereas a destination SIM card to which the SIM card information is copied is referred to as a "slave SIM card".

The wireless WAN base station 40 is a wireless base station which is compliant with a wireless WAN scheme, such as the Global System for Mobile Communications (GSM), the Long Term Evolution (LTE), the Wideband Code Division Multiple Access (W-CDMA), the High Speed Packet Access (HSPA), the HSPA Evolution (HSPA+), and includes a wireless WAN antenna 41. The configuration and functions of the wireless WAN base station 40 can be embodied by means of a wide variety of known techniques, and the descriptions therefor are omitted.

The wireless WAN base station 40 is connected to servers 51 via the Internet 50. The servers 51 store media data, such as sounds, video, and text data, for providing such data.

The master terminal 10 is a mobile phone 10 including an inter-terminal wireless communication function, in addition to a wireless WAN communication function, for example. In the following descriptions, the master terminal 10 is also referred to as the "mobile phone 10".

The mobile phone 10 is a mobile phone terminal that is capable of performing a wireless WAN communication in accordance with the GSM scheme, for example. The mobile phone 10 can perform voice calls and data communication with other mobile phones 10 through a wireless WAN via the wireless WAN base station 40.

The mobile phone 10 can also perform a wireless packet communication through the wireless WAN. Through wireless packet communication, the mobile phone 10 can send and receive mobile mails, and access sites that are exclusively designed for accesses through mobile phones. The mobile phone 10 can also download various types of data, such as music and video, from distribution site, through wireless packet communication.

The slave terminal 20 is a personal computer (PC) 20 including an inter-terminal wireless communication function, in addition to a wireless WAN communication function, for example. For example, the slave terminal 20 may be a notebook PC, a desktop PC, or a mobile PC. In the following descriptions, the slave terminal 20 is also referred to as the "PC 20".

As set forth above, this wireless WAN communication is a wireless WAN communication that is performed in accordance with a communication standard, such as the GSM or LTE.

Note that the standard for the wireless WAN communication between the master terminal 10 and the wireless WAN base station 40 may be the same as or different from the standard for the wireless WAN communication between the PC 20 and the wireless WAN base station 40, which will be described later. For example, the standard for the wireless WAN communication between the master terminal 10 and the wireless WAN base station 40 may be the GSM, whereas the standard for the wireless WAN communication between the PC 20 and the wireless WAN base station 40 may be the LTE. The LTE has a bandwidth wider than that of the GSM, thereby enabling high-speed communication of large data, such as video data.

On the other hand, the inter-terminal wireless communication used for exchanging SIM card information between the master terminal 10 and the slave terminal 20 is a wireless communication in accordance with Bluetooth® or a certain wireless LAN standard.

The PC 20 can perform voice calls and data communication through a wireless WAN. For example, the PC 20 is a notebook PC that can perform a wireless WAN communication in accordance with the LTE.

The PC 20 can also perform a wireless packet communication over the wireless WAN via the wireless WAN base station 40. Through the wireless packet communication, the PC 20 can also download various types of data, such as music and video, from distribution site.

Now referring to FIG. 2, the hardware configuration of the mobile phone 10 will be described. As depicted in FIG. 2, the mobile phone 10 includes a wireless WAN communication circuit 11, a SIM card 12, an inter-terminal communication port 14, a central processing unit (CPU) 15, the memory 16, an input/output (I/O) interface 17, a wireless WAN antenna 18, and a bus 210.

The wireless WAN communication circuit (first communication unit) 11 is a circuit that performs a wireless WAN communication based on information (SIM information) stored in the SIM card 12 which will be described later. The wireless WAN communication circuit 11 controls transmission of location information of the mobile phone 10 to the wireless WAN base station 40, reception of radio waves from the wireless WAN base station 40, and voice calls and data communication. For example, when the mobile phone 10 is powered on, the wireless WAN communication circuit 11 sends information for informing the location of the mobile phone 10, to the wireless WAN base station 40. When the level of the field intensity received from the wireless WAN base station 40 decreases due to migration of the mobile phone 10 or the like, the wireless WAN communication circuit 11 performs handover to an adjacent wireless WAN base station 40 having stronger field intensity.

The SIM card (first storage) 12 is a contact-type slottable IC card that can be attached to and detached from the mobile phone 10, for example. The SIM card 12 has an IMSI (SIM information, user information) that is a unique number for identifying a subscriber (user) of the mobile phone 10, and the mobile phone 10 enables a wireless WAN communication by relating the IMSI to a telephone number. Such SIM information is stored in the SIM card 12. The mobile phone 10 reads various types of information including the SIM information (hereinafter, such information is correctively referred to as "SIM information") from the SIM card 12 and stores it into the memory 16 which will be described later. Thereby, the mobile phone 10 functions as a mobile phone having the telephone number of the subscriber (user) and the SIM information.

The inter-terminal communication port (second communication unit) 14 is a communication port that performs an inter-terminal wireless communication. The inter-terminal wireless communication may be a wireless communication having a communication distance smaller than that of the wireless WAN communication. For example, the inter-terminal communication port 14 is a communication port that performs a wireless communication in accordance with Bluetooth®. The inter-terminal wireless communication with the PC 20 is achieved via the inter-terminal communication port 14 and an the inter-terminal communication port 24 in the PC 20, which will be described later.

The CPU 15 is a processor that executes various types of processing in the mobile phone 10. The CPU 15 embodies various functions of the mobile phone 10 by executing a program stored in the memory 16. For example, the CPU 15 reads a communication program from the memory 16 and executes the communication program, thereby embodying the functions of a communication controller 13 which will be described later.

The memory 16 is a storage that stores a program and data for executing operations of the mobile phone 10. The memory 16 may be a random access memory (RAM) or a read only memory (ROM).

The memory 16 also stores various types of data. Examples of data stored include, address books, mobile mails that are sent or received, pictures and movies captured by a camera (not illustrated) mounted to the mobile phone 10, downloaded music data. The CPU 15 reads various programs from the memory 16 and executes the programs.

The I/O interface 17 is an interface for inputs or outputs from or to the mobile phone 10 and external peripheral devices (not illustrated). Examples of the I/O interface 17 include the Universal Serial Bus (USB) and Near Field Communication (NFC) interfaces, for example.

The wireless WAN antenna 18 is an antenna for sending and receiving radio waves for a wireless WAN communication with the wireless WAN base station 40.

The bus 210 interconnects the wireless WAN communication circuit 11, the SIM card 12, the inter-terminal communication port 14, the CPU 15, the memory 16, the I/O interface 17, and the wireless WAN antenna 18.

Next, referring to FIG. 1, the functions of the mobile phone 10 is described.

As depicted in FIG. 1, the mobile phone 10 includes the communication controller 13.

The communication controller 13 functions to perform communications in a present embodiment, and includes a data processor 101, a migration determination unit 102, an inter-terminal communication controller 103, a SIM information transmission and receiver 104, and a communication migrator 105.

The data processor 101 downloads data from the server 51 through the wireless WAN communication, processes the downloaded data.

During download of data by the data processor 101, the migration determination unit (determination unit) 102 determines whether the data is to be processed by the mobile phone 10 or the PC 20.

Note that this determination may be made automatically based on setting that has been preset to the mobile phone 10 in advance, or may be made manually by a user of the mobile phone 10.

When the setting has been preset to the mobile phone 10 in advance, the mobile phone 10 is preset by the user such that, when downloaded data is video data, the data is processed by the PC 20, whereas when download data is data other than video, the data is processed by the mobile phone 10, for example. The settings (setting values) are then stored into the memory 16 in the mobile phone 10, for example.

Then, the migration determination unit 102 checks the type of data that is being downloaded. When the download data is video, the migration determination unit 102 determines that the data is to be processed by the PC 20 and causes the inter-terminal communication controller 103 initiate an inter-terminal communication with the PC 20.

When the migration determination unit 102 determines that the download data is to be processed by the PC 20, the inter-terminal communication controller 103 establishes an inter-terminal communication between the mobile phone 10 and the PC 20. Specifically, the inter-terminal communication controller 103 instructs the above-described inter-terminal communication port 14 to send an inter-terminal communication request to the PC 20. In response to receiving a response to the connection request from the PC 20, the inter-terminal communication controller 103 establishes an inter-terminal communication between the mobile phone 10 and the PC 20, if the PC 20 supports an inter-terminal connection.

Alternatively, when a wireless WAN communication is to be migrated from the PC 20, in response to receiving an inter-terminal communication request from the PC 20, the inter-terminal communication controller 103 establishes an inter-terminal communication with the PC 20.

When the wireless WAN communication is to be migrated to the PC 20, the SIM information transmission and receiver (user information transmitter) 104 sends SIM information in the SIM card 12 in the mobile phone 10 to the PC 20, through the inter-terminal communication established by the inter-terminal communication controller 103.

The communication migrator (migration unit) 105 activate a duplicated SIM card 22 in the PC 20, and deactivates the SIM card 12 in the mobile phone 10, for disconnecting the connection between the mobile phone 10 and the wireless WAN communication base station 40 and migrating the wireless WAN communication to the PC 20. In other words, the communication migrator (migration unit) 105 initiates a wireless WAN communication between the wireless WAN communication base station 40 and the PC 20, in place of the wireless WAN communication between the mobile phone 10 and the wireless WAN communication base station 40.

Note that the term "activation of a SIM card" refers to enabling (validating) SIM information in the SIM card, whereas the term "deactivation of a SIM card" refers to disenabling (invalidating) SIM information in the SIM card. A SIM card can be activated or deactivated by changing setting an internal flag in the SIM card.

A SIM card can be deactivated, for example, by replacing at least a part of SIM information in the SIM card 12 or 22 with a continuous sequence having a certain pattern, such as "0000" and "1111", for example, thereby making the SIM information unreadable. Before deactivating, for example, the SIM information in the SIM card 12 or 22 is copied to the memory 16 or 26 or other suitable storage.

On the other hand, the SIM cards 12 and 22 can be activated by setting a correct value to the SIM information in the SIM card 12 or 22.

Figure 11:
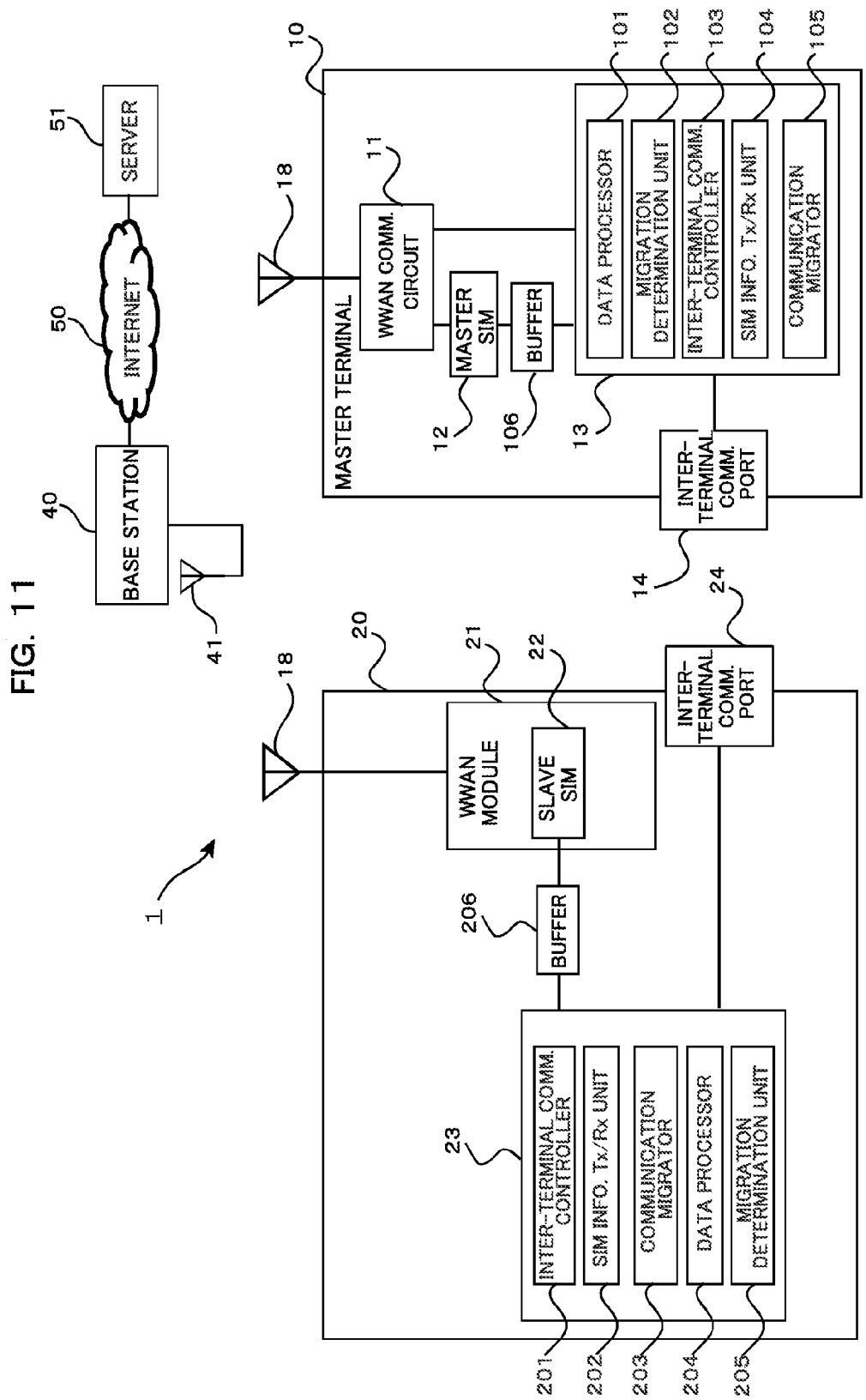
FIG. 11 is a functional block diagram of a modification to a system as an example of an embodiment.

Alternatively, as depicted in FIG. 11, buffers 106 and 206 for storing flag values indicating that the SIM information is activated or deactivated, may be provided in the mobile phone 10 and the PC 20, respectively. For example, if the flag value of "1" in the buffer 106 or 206 indicates that the SIM information in the corresponding SIM card is enabled whereas the flag value of "0" in the buffer 106 or 206 indicates that the SIM information in the corresponding SIM card is disabled.

Alternatively, instead of deactivating the SIM card, the SIM information in the SIM card may be deleted. In this case, instead of activating the SIM card, SIM information is copied from another SIM card to the SIM card that is to be enabled. In such a case, the SIM information transmission and receiver 104 may receive SIM information in the SIM card 22 in the PC 20, which will be described later, and write the received SIM information into the SIM card 12 in the mobile phone 10.

The functions of the communication controller 13, the data processor 101, the migration determination unit 102, the inter-terminal communication controller 103, the SIM information transmission and receiver 104, and the communication migrator 105 described above are embodied by the CPU 15 by reading a program stored in the memory 16 in the mobile phone 10 and executing the program.

Note that other functions and configuration of the mobile phone 10 can be embodied by means of a wide variety of known techniques, and the descriptions therefor are omitted.

Next, referring to FIG. 3, the hardware configuration of the PC 20 will be described.

As depicted in FIG. 3, the PC 20 includes a wireless WAN module 21, a SIM card 22, an inter-terminal communication port 24, a CPU 25, a memory 26, an I/O interface 27, a wireless WAN antenna 28, hard disk drives (HDDs) 29, and a bus 310.

The wireless WAN module (third communication unit) 21 is a circuit that performs a wireless WAN communication based on information stored in the SIM card 22 which will be described later. The wireless WAN module 21 controls communications with wireless WAN base stations. The wireless WAN module 21 may be mounted within the PC 20, or may be mounted as an external module in a PC card slot (not illustrated) or a USB interface (not illustrated) in the PC 20.

The SIM card (second storage) 22 is a contact-type slottable IC card that can be attached to and detached from wireless WAN module 21. Unlike the SIM card 12 in mobile phone 10 set forth above, no SIM information is recorded or recorded SIM information is disabled on the SIM card 22 in the PC 20 in the initial status. The SIM card 22 is provided such that the SIM information in the SIM card 12 in the mobile phone 10 is to be transferred to the SIM card 22 in the PC 20. In other words, the SIM card 22 is a SIM card for duplication to which the SIM information in the SIM card 12 in the mobile phone 10 is to be stored.

The inter-terminal communication port (fourth communication unit) 24 is a communication port that performs an inter-terminal wireless communication. The inter-terminal wireless communication may be a wireless communication having a communication distance smaller than that of the wireless WAN communication. For example, the inter-terminal communication port 24 is a communication port that performs a wireless communication in accordance with Bluetooth®. The inter-terminal wireless communication with the mobile phone 10 is achieved via the inter-terminal communication port 14 and an inter-terminal communication port 24 in the mobile phone 10.

The CPU 25 is a processor that executes various types of processing in the PC 20. The CPU 25 embodies various functions of the PC 20 by executing a program stored in the memory 26 or the HDDs 29, which will be described later. For example, the CPU 25 reads a communication program from the HDDs 29 to the memory 26 and executes the communication program, thereby embodying the functions of a communication controller 23 which will be described later.

The memory 26 is a storage that stores a program and data for executing operations of the PC 20. The memory 26 also stores various types of data. The memory 16 may be a random access memory (RAM) or a read only memory (ROM).

The I/O interface 27 is an interface for inputs or outputs from or to the PC 20 and external peripheral devices. Examples of the I/O interface 27 include the USB and NFC interfaces, for example.

The wireless WAN antenna 28 is an antenna for sending and receiving radio waves for a wireless WAN communication with the wireless WAN base station 40.

The HDDs 29 are storages that store an operating system (OS) of the PC 20 and programs executed in the PC 20, and data for executing those programs. The HDDs 29 also store various types of other data. Although the two HDDs 29 are illustrated in FIG. 3, the number of the HDDs 29 is not limited to two and one or more than two HDDs may be provided.

The bus 310 interconnects the wireless WAN module 21, the SIM card 22, the inter-terminal communication port 24, the CPU 25, the memory 26, the I/O interface 27, the wireless WAN antenna 28, and the HDDs 29.

Note that other functions and configuration of the PC 20 can be embodied by means of a wide variety of known techniques, and the descriptions therefor are omitted.

Next, referring to FIG. 1, the functions of the PC 20 is described.

As depicted in FIG. 1, the PC 20 includes the communication controller 23.

The communication controller 23 functions to perform communications in a present embodiment, and includes an inter-terminal communication controller 201, a SIM information transmission and receiver 202, a communication migrator 203, a data processor 204, and a migration determination unit 205.

In response to receiving an inter-terminal communication request from the mobile phone 10 in the above-described inter-terminal communication port 24, the inter-terminal communication controller 201 establishes an inter-terminal communication with the mobile phone 10.

When the migration determination unit 205 which will be described later determines that download data is to be processed back in the mobile phone 10, the inter-terminal communication controller 201 establishes an inter-terminal communication between the PC 20 and the mobile phone 10. Specifically, the inter-terminal communication controller 201 instructs the above-described inter-terminal communication port 24 to send an inter-terminal communication request to the mobile phone 10. In response to receiving a response to the connection request from the mobile phone 10, the inter-terminal communication controller 201 establishes an inter-terminal communication between the PC 20 and the mobile phone 10, if the mobile phone 10 supports an inter-terminal connection.

When the wireless WAN communication is to be migrated to the PC 20, the SIM information transmission and receiver (user information receiver) 202 receives SIM information in the SIM card 12 in the mobile phone 10, through the inter-terminal communication established by the inter-terminal communication controller 201, and writes the content of the received SIM information into the SIM card 22 in the PC 20.

The communication migrator 203 activates the SIM card 22 to which data is written by the SIM information transmission and receiver 202, and performs a wireless WAN communication with the wireless WAN communication base station 40, based on the SIM information written in the SIM card 22.

When the migration determination unit 205 which will be described later determines that the wireless WAN communication is to be migrated back to the mobile phone 10 while the PC 20 is performing the wireless WAN communication with the wireless WAN communication base station 40, the communication migrator 203 deactivates the SIM card 22 in the PC 20. Thereby, the connection between the PC 20 and the wireless WAN communication base station 40 is disconnected, and the wireless WAN communication is returned to the mobile phone 10.

The data processor (reception processor) 204 downloads data through the wireless WAN communication data that is migrated from the mobile phone 10, and processes the downloaded data. The data may be played (replayed) from the point where the wireless WAN communication is migrated from the mobile phone 10 or from the beginning of the data, depending on the setting that has been preset to the mobile phone 10 and/or the PC 20 in advance, or an instruction by the user.

The migration determination unit 205 determines whether or not the wireless WAN communication is to be returned to the mobile phone 10. This determination may be made based on setting that has been preset to the mobile phone 10 and/or the PC 20 in advance, or may be made based on an instruction by the user.

As the settings for determining whether or not a wireless WAN communication is to be returned to the mobile phone 10 may be preset to the mobile phone 10 and/or the PC 20 at the time when download of data is completed, for example. Such settings may be preset to the PC 20 by the user in advance, or may be sent from the mobile phone 10 to the PC 20 when a wireless WAN is migrated from the mobile phone 10.

When the migration determination unit 205 determines that the wireless WAN communication is to be returned to the mobile phone 10, the inter-terminal communication controller 201 instructs an establishment of an inter-terminal communication with the mobile phone 10. In response, the communication migrator 203 instructs the mobile phone 10 to activate the SIM card in the mobile phone 10, via the inter-terminal communication. The communication migrator 203 then deactivates the SIM card 12 in the PC 20, and migrates the wireless WAN communication to the mobile phone 10.

The functions of the communication controller 13, the migration determination unit 102, the inter-terminal communication controller 103, the SIM information transmission and receiver 104, and the communication migrator 105 described above are embodied by the CPU 15 by reading a program stored in the memory 16 in the PC 20 and executing the program.

Next, referring to FIGS. 4A, 4B and 5, an example where a wireless WAN communication is migrated from the mobile phone 10 to the PC 20 in the system 1 will be described. As used herein, the term "wireless WAN communication is migrated" does not mean removing and inserting a SIM card, but means switching terminals on which a wireless WAN communication is to be performed between master and slave terminals, using user information (SIM information) in a single SIM card.

Figure 4A:
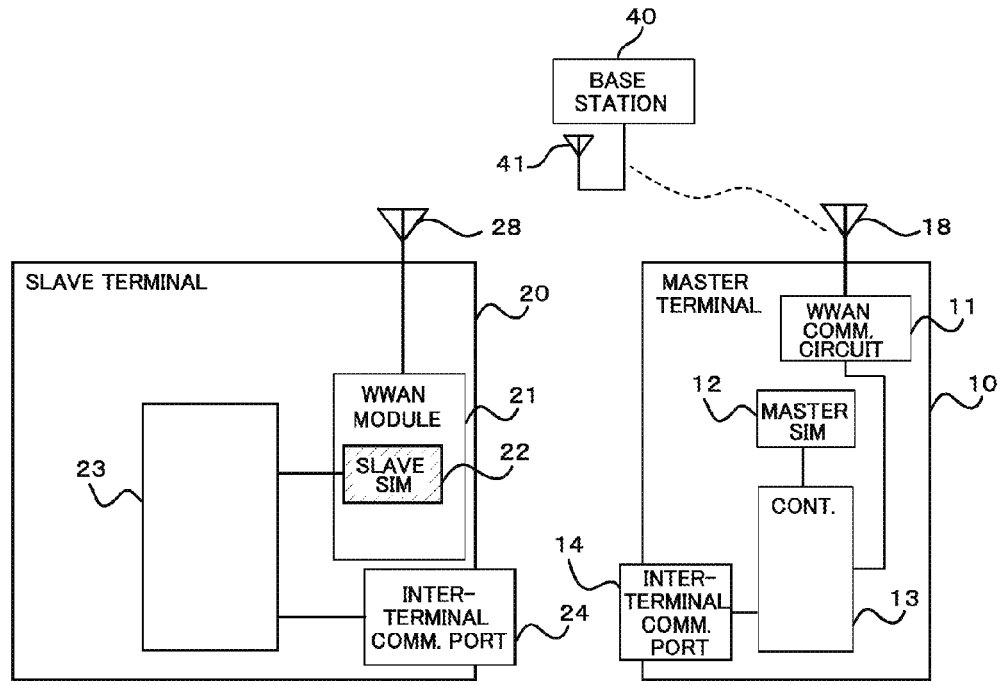
FIGS. 4A and 4B are schematic diagrams illustrating an example wherein communication is migrated from the mobile phone as a master terminal to the PC as a slave terminal, in the system as an example of an embodiment.

In FIG. 4A, the wireless WAN base station 40 and the mobile phone 10 are performing a wireless WAN communication. In FIG. 4B, the mobile phone 10 and the PC 20 are performing an inter-terminal communication, while the wireless WAN base station 40 and the mobile phone 10 are performing a wireless WAN communication. In FIG. 5, the wireless WAN base station 40 and the PC 20 are performing a wireless WAN communication.

In FIG. 4A, a wireless WAN communication is performed between the mobile phone 10 and the wireless WAN base station 40. The SIM card (master SIM) 12 in the mobile phone 10 stores SIM information and the SIM card is activated, which allows the mobile phone 10 to connect to the wireless WAN base station 40. In contrast, the SIM card (slave SIM) 22 inserted in the wireless WAN module 21 in the PC 20 (slave terminal) is deactivated (in the drawings, the deactivated elements are hatched), which prohibits the PC 20 from connecting to the wireless WAN base station 40.

Here, for example, a user may desire to migrate a wireless WAN communication from the mobile phone 10 (master terminal) to the PC 20 (slave terminal) (in other words, the use may desire to perform a wireless WAN communication not using the mobile phone 10, but using the PC 20). The user executes certain operations for migrating the wireless WAN communication, such as operating buttons in graphical the user interfaces (GUIs) of the mobile phone 10 and/or the PC 20.

The operations are detected by the migration determination unit 102 in the mobile phone 10.

Figure 4B:
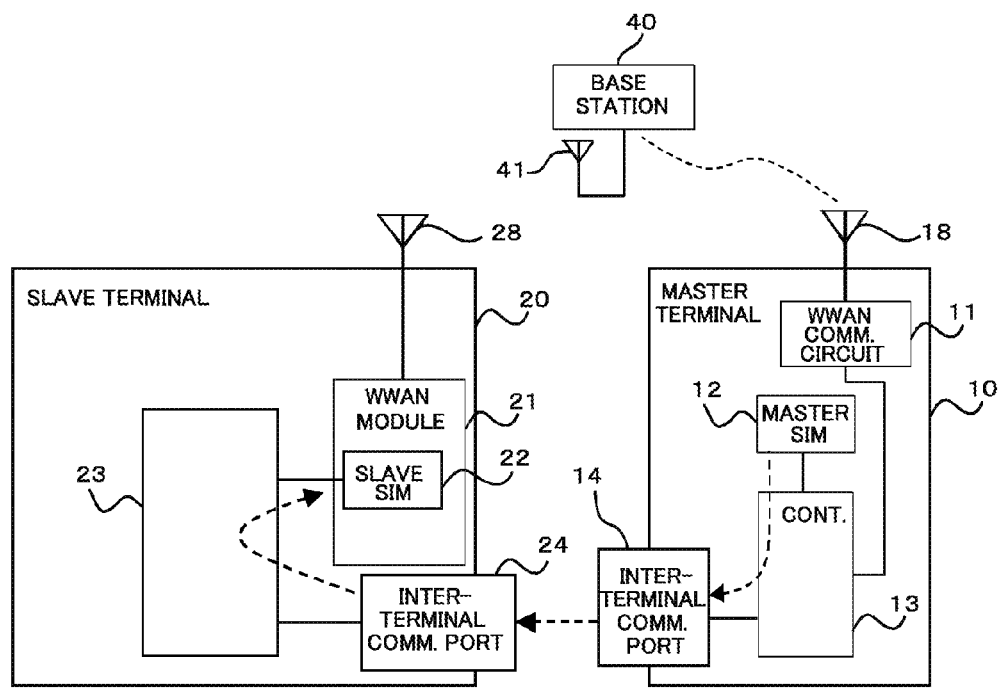
Figure 5:
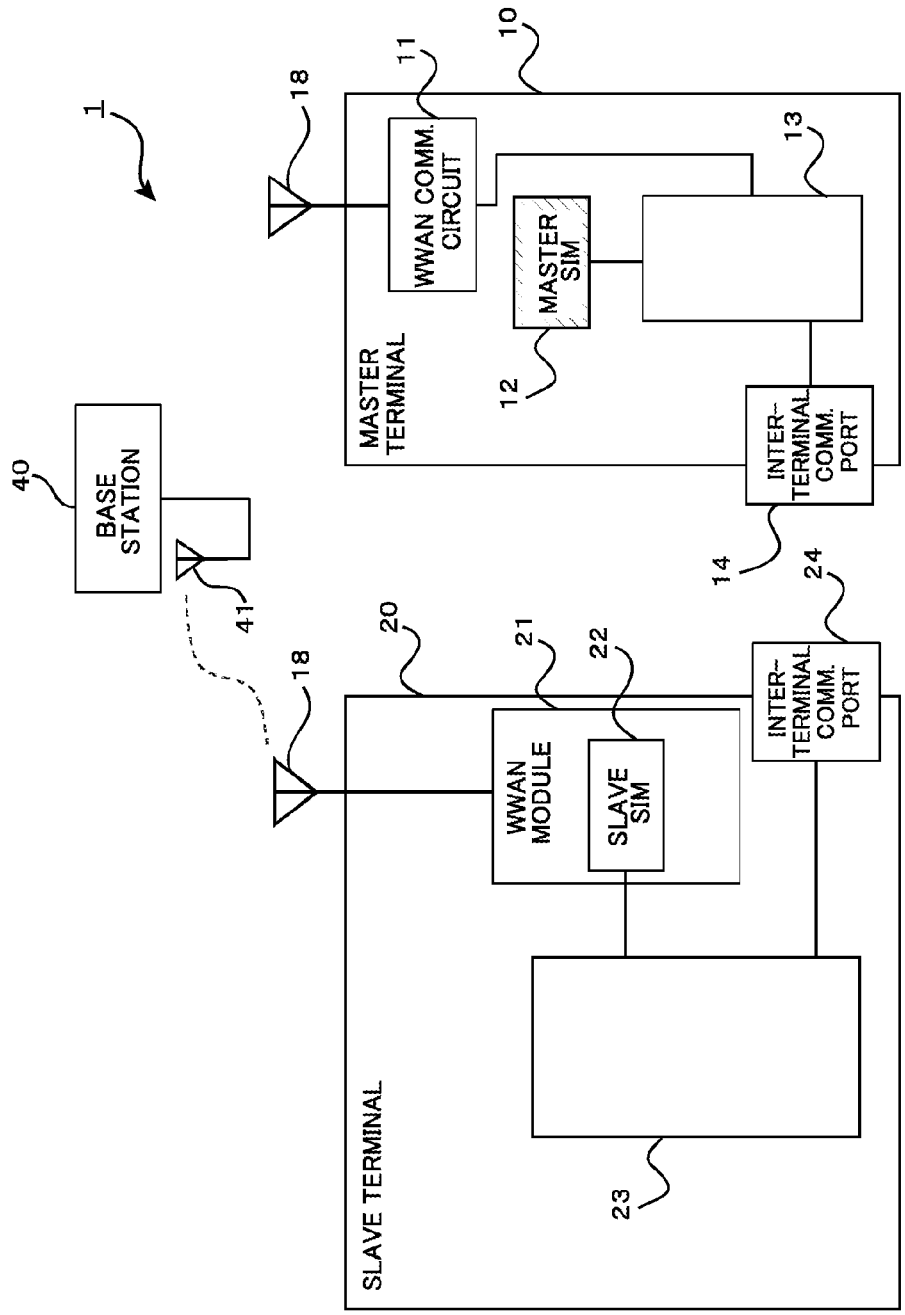
FIG. 5 is a schematic diagram illustrating an example wherein communication is migrated from the mobile phone as a master terminal to the PC as a slave terminal, in the system as an example of an embodiment.

Then, as depicted in FIG. 4B, the inter-terminal communication controller 103 in the mobile phone 10 connects between the inter-terminal communication port 14 in the mobile phone 10 and the inter-terminal communication port 24 in the PC 20.

The SIM information transmission and receiver 104 in the mobile phone 10 then sends the SIM information in the SIM card 12 in the mobile phone 10 to the SIM card 22 in the PC 20. The SIM information transmission and receiver 202 in the PC 20 receives the transmitted SIM information, and writes it into the SIM card 22.

If identical SIM information were used in multiple terminals, the wireless WAN base station 40 would not be able to succeed to perform a wireless WAN communication. For preventing such conflict of SIM information, as depicted in FIG. 5, once SIM information is copied from the SIM card 12 to the SIM card 22, the communication migrator 105 in the mobile phone 10 deactivates the master SIM card 12 (in the drawings, the deactivated elements are illustrated in gray), thereby terminating communications with the mobile phone 10. At the same time, the communication migrator 203 in the PC 20 activates the slave SIM card 22 for initiating a communication with the PC 20, whereby allowing the wireless WAN base station 40 to communicate with the PC 20. In the above processes, the communication terminals are switched.

Although the wireless WAN communication is manually migrated by the user in the above-described example, the wireless WAN communication may be automatically migrated according to data. For example, a selection may be made between continuing the communication with the mobile phone 10 and migrating the communication from the mobile phone 10 to the PC 20, according to the type of data that is being communicated. For example, if data that is being communicated is large video data, download and replay of the video may be performed on the PC 20 that has a wider wireless WAN communication band (e.g., LTE) and a higher processing performance. In contrast, smaller data, such as images other than videos, sound, and text data, may be downloaded, replayed, or otherwise processed on the mobile phone 10 that has a narrower wireless WAN communication band (e.g., GSM) and a lower processing performance.

Now referring to FIGS. 6A, 6B, 7A, and 7B, an example where a wireless WAN communication is migrated from a mobile phone as the master terminal 10 to a PC as the slave terminal 20, in an example of an embodiment, according to the type of data that is being communicated.

Figure 6A:
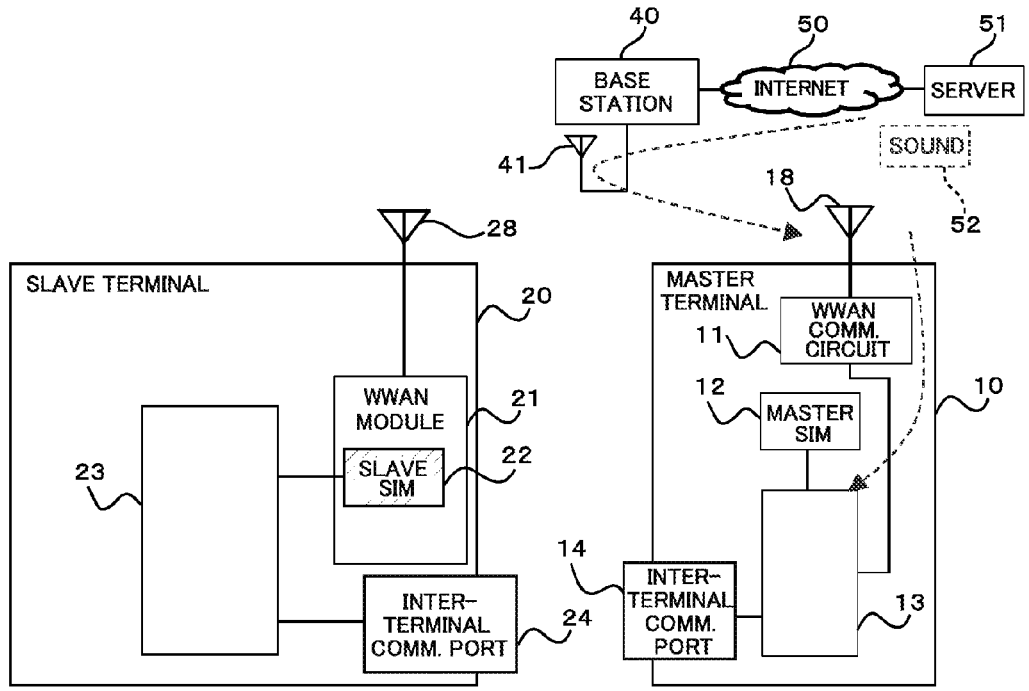
FIGS. 6A and 6B are schematic diagrams illustrating an example wherein communication is migrated from the mobile phone as a master terminal to the PC as a slave terminal, according to the data type, in the system as an example of an embodiment.
Figure 6B:
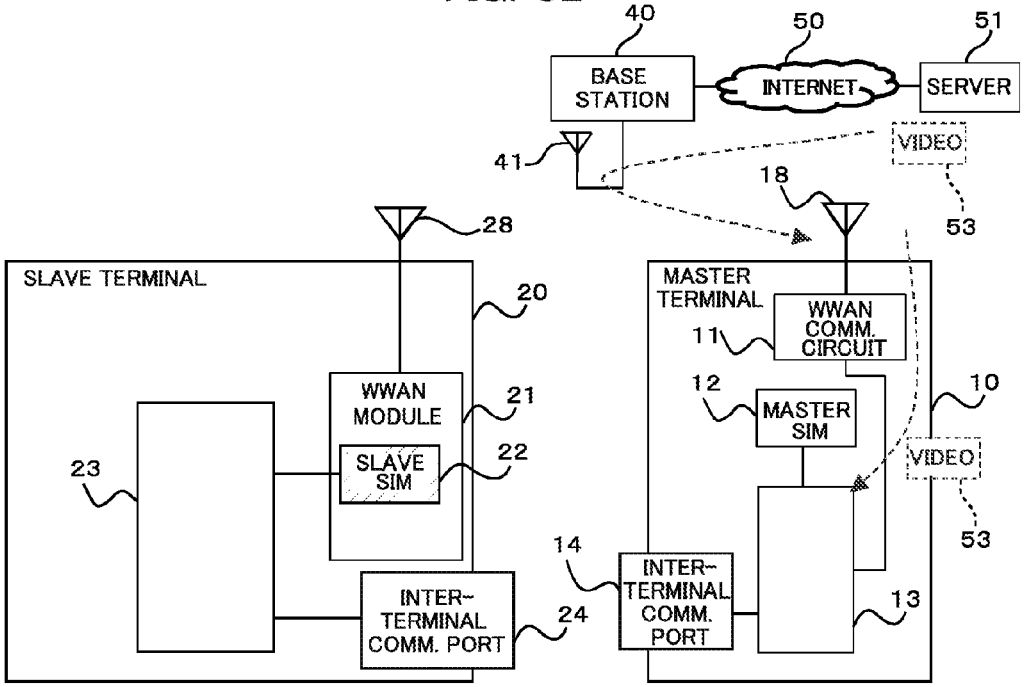
Figure 7A:
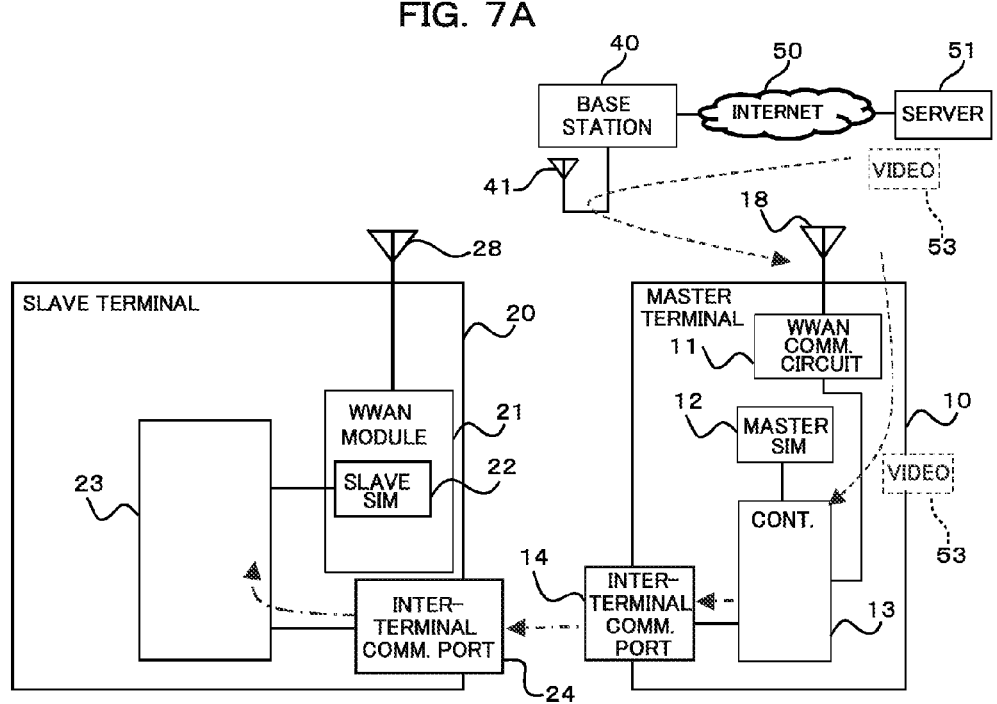
FIGS. 7A and 7B are schematic diagrams illustrating an example wherein communication is migrated from the mobile phone as a master terminal to the PC as a slave terminal, according to the data type, in the system as an example of an embodiment.
Figure 7B:
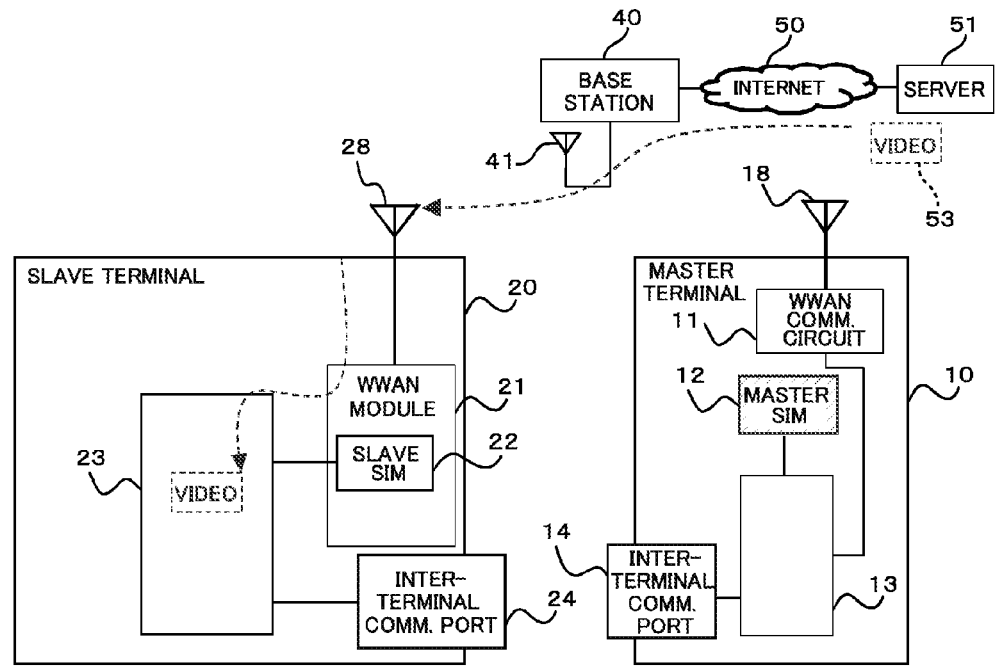

In FIG. 6A, the wireless WAN base station 40 and the mobile phone 10 are performing a wireless WAN communication, and sound data 52 is to be downloaded. In FIG. 6B, the wireless WAN base station 40 and the mobile phone 10 are performing the wireless WAN communication, and download of video data 53 is initiated. In FIG. 7A, the wireless WAN communication is being migrated from the mobile phone 10 to the PC 20. In FIG. 7B, the wireless WAN base station 40 and the PC 20 are performing the wireless WAN communication, and the video data 53 is to be downloaded.

In FIG. 6A, the mobile phone 10 (master terminal) is connected to the wireless WAN base station 40.

The user of the mobile phone 10 is browsing information on the Internet 50 using a browser. Since the display (not illustrated) of the mobile phone 10 is small, the user can browse only a portion of the information the user is browsing.

The user also is obtaining sound data 52, such as music, from the Internet 50 to the mobile phone 10, for example. In this case, since the sound data 52 is small, the data 52 can be tolerably handled by the mobile phone 10 with a narrower communication band and a lower processing performance.

The user then desires to download video data 53 from the Internet 50 using the browser on the mobile phone 10. For example, using the browser, the user opens a site for downloading the video data 53, and clicks a "download" button.

As depicted in FIG. 6B, the mobile phone 10 receives data that is sent from the server 51 through the Internet 50, via the wireless WAN base station 40. The migration determination unit 102 in the mobile phone 10 inspects header information (for example, meta data described in the file if the data is video data 53) or the file extension information of the data, to check whether the type of the data is video.

When the type of the data is video, as depicted in FIG. 7A, the inter-terminal communication controller 103 in the mobile phone 10 performs an inter-terminal wireless communication with the inter-terminal communication port 24 in the PC 20, using the inter-terminal communication port 14. The SIM information transmission and receiver 104 in the mobile phone 10 then sends the SIM information in the master SIM card 12 in the mobile phone 10 to the PC 20. The SIM information transmission and receiver 202 in the PC 20 receives the SIM information, and writes it into the slave SIM card 22 in the wireless WAN module 21 in the PC 20.

Next, the communication migrator 105 in the mobile phone 10 deactivates the SIM card 12 in the mobile phone 10. At the same time, the communication migrator 203 in the PC 20 activates the SIM card 22 in the wireless WAN module 21 in the PC 20. This allows the PC 20 to communicate with the wireless WAN base station 40, while inhibiting the mobile phone 10 from communicating with the wireless WAN base station 40.

Thereafter, the data processor 204 in the PC 20 receives radio waves from the wireless WAN base station 40, and takes over the communication which was performed in the mobile phone 10 to continue the data communication. In this case, any procedure is absent for reconnection with the wireless WAN base station 40 (e.g., handshakes typical in wireless WAN communications). Once the above-described processing is completed, the wireless WAN base station 40 is connected and communicates with the PC 20, instead of communicating with the mobile phone 10.

In the PC 20, a browser or a video data browser is launched and the video data 53 is played.

Next, in FIG. 7B, in response to the migration determination unit 205 in the PC 20 detecting that the playback of the video data 53 is completed, the migration determination unit 205 initiate processing for returning the communication to the mobile phone 10.

As depicted in FIG. 7B, the inter-terminal communication controller 201 in the PC 20 establishes an inter-terminal wireless communication with the inter-terminal communication port 14 in the mobile phone 10, using the inter-terminal communication port 24. In response, the communication migrator 203 in the PC 20 instructs the mobile phone 10 to activate the SIM card 12 in the mobile phone 10, via the inter-terminal communication. The communication migrator 105 in the mobile phone 10 activates the SIM card 12, according to the instruction that is received from the PC 20 via the inter-terminal communication.

At the same time, the communication migrator 203 in the PC 20 deactivates the SIM card 22 in the PC 20. Thereafter, the mobile phone 10 receives radio waves from the wireless WAN base station 40, and takes over the communication which was performed in the wireless WAN module 21 in the PC 20 to continue the data communication. In this case, any procedure is present for reconnection with the wireless WAN base station 40 (e.g., handshakes typical in wireless WAN communications). Once the above-described processing is completed, the wireless WAN base station 40 is connected and communicates with the mobile phone 10, instead of communicating with PC 20.

By repeating the procedures described above, in an example of the present embodiment, a terminal for receiving data can be switched between the master and slave terminals according to the type of data.

Figure 8:
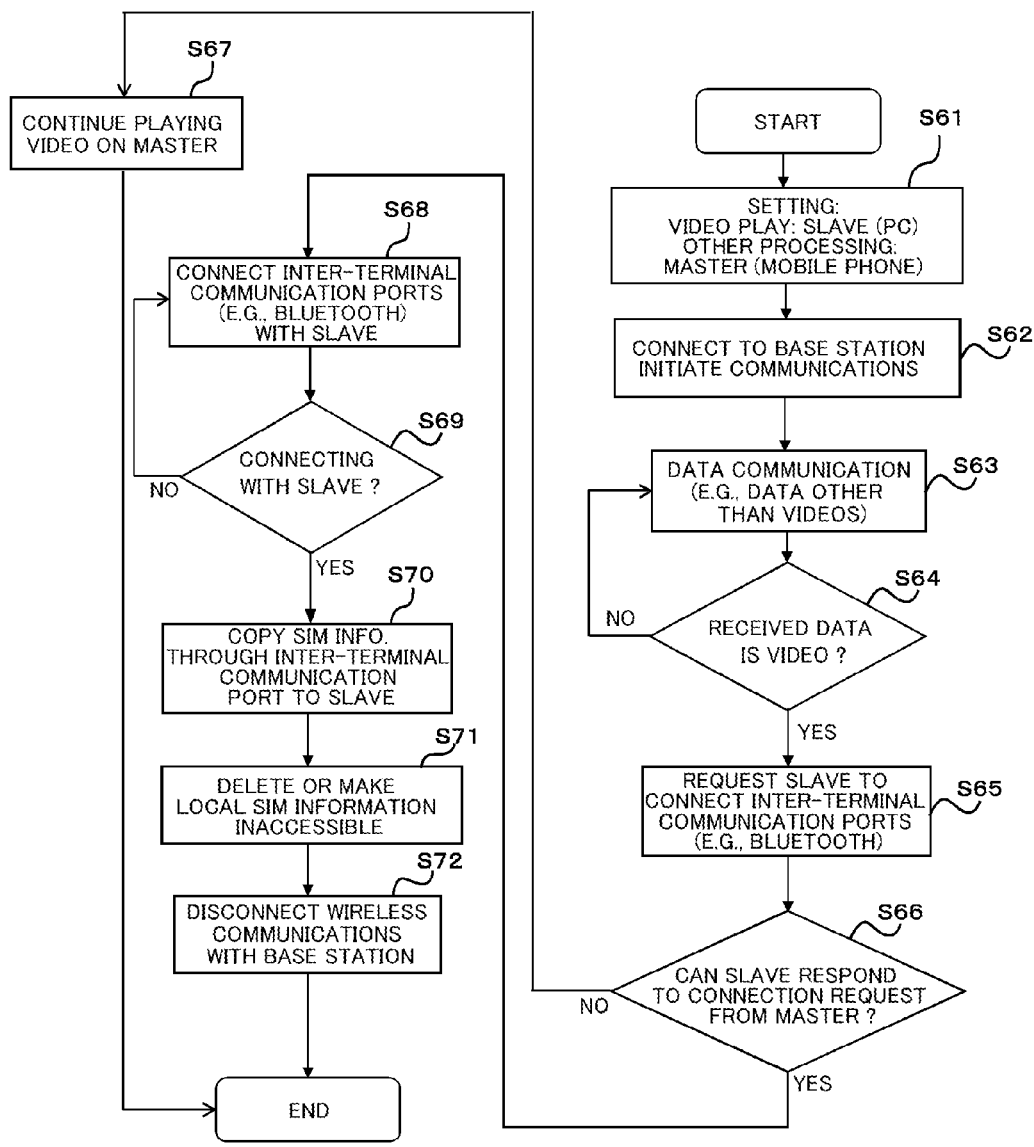
FIG. 8 is a flowchart illustrating the processing by the master terminal for switching a terminal for receiving data between a master terminal and a slave terminal according to the type of data in an example of an embodiment.

The processing in the master terminal for switching a receiving terminal according to the type of data, in the system 1 as an example of an embodiment configured as described above, is depicted in FIG. 8.

This example exemplifies the case where the master terminal is a mobile phone 10 and the slave terminal is a notebook PC 20.

In Step S 61, a user sets the mobile phone 10 such that processing for replay a video is handled on the notebook PC 20, and processing on data in other types than video is handled on the mobile phone 10. The setting is made through a GUI for the setting in the mobile phone 10. The user also sets whether the SIM card 12 is deactivated or SIM information in the SIM card 12 is deleted for disabling the SIM card 12. The same setting is made both in the mobile phone 10 and in the PC 20, and the setting values may be stored in the memory 16 in the mobile phone 10, for example.

Next in Step S 62, the user connects to the wireless WAN base station 40 using the mobile phone 10 for initiating a data communication.

Next in Step S 63, the mobile phone 10 performs a data communication, using the wireless WAN antenna 18 and the wireless WAN communication circuit 11. In this step, data received via the wireless WAN base station 40 is data to be received and processed in the mobile phone 10, as set in Step S 61. For example, data received is data other than videos, and such data is processed by the data processor 101 in the mobile phone 10 for replay.

In Step S 64, every time data is received, the migration determination unit 102 in the mobile phone 10 determines whether or not received data contains a video, according to the setting made in Step S 61. The determination is made by checking header information (for example, meta data described in the file) or the file extension information of the received data, for example. When the received data contains no video (refer to the NO route from Step S 64), the flow returns to Step S 63 to continue the data communication.

In contrast, when the received data contains a video in Step S 64 (refer to the YES route from Step S 64), in Step S 65, the inter-terminal communication controller 103 in the mobile phone 10 sends a connection request for the inter-terminal communication port 24, to the notebook PC 20 that is a slave terminal.

In Step S 66, the inter-terminal communication controller 103 in the mobile phone 10 receives a response to the connection request for the inter-terminal communication port 24, from the notebook PC 20, and determines whether or not the notebook PC 20 supports an inter-terminal connection. When the notebook PC 20 does not support an inter-terminal connection (refer to the NO route from Step S 66), the mobile phone 10 replays the video on the mobile phone 10 (Step S 67) and the processing is terminated.

In contrast, the notebook PC 20 supports an inter-terminal connection in Step S 66 (refer to the YES route from Step S 66), in Step S 68, the inter-terminal communication controller 103 in the mobile phone 10 makes a connection to the notebook PC 20 that is the slave terminal, via the inter-terminal communication ports 14 and 24.

In Step S 69, the inter-terminal communication controller 103 in the mobile phone 10 determines whether or not a connection between the inter-terminal communication ports 14 and 24 is established with the notebook PC 20. When a connection between the inter-terminal communication ports 14 and 24 is not established with the notebook PC 20 (refer to the NO route from Step S 69), the inter-terminal communication controller 103 in the mobile phone 10 returns to Step S 68 to retry to establish a connection between the inter-terminal communication ports 14 and 24.

In contrast, an inter-terminal communication port connection can be established with the notebook PC 20 in Step S 69 (refer to the YES route from Step S 69), in Step S 70, the SIM information transmission and receiver 104 in the mobile phone 10 sends SIM information in the SIM card 12 to the notebook PC 20, via the inter-terminal communication port 14.

Next, in Step S 71, the communication migrator 105 in the mobile phone 10 deactivates the SIM card 12.

Next, as a result of the deactivation of the SIM card 12, the wireless WAN communication between the mobile phone 10 and the wireless WAN base station 40 is disconnected in Step S 72, and the processing is terminated.

Figure 9:
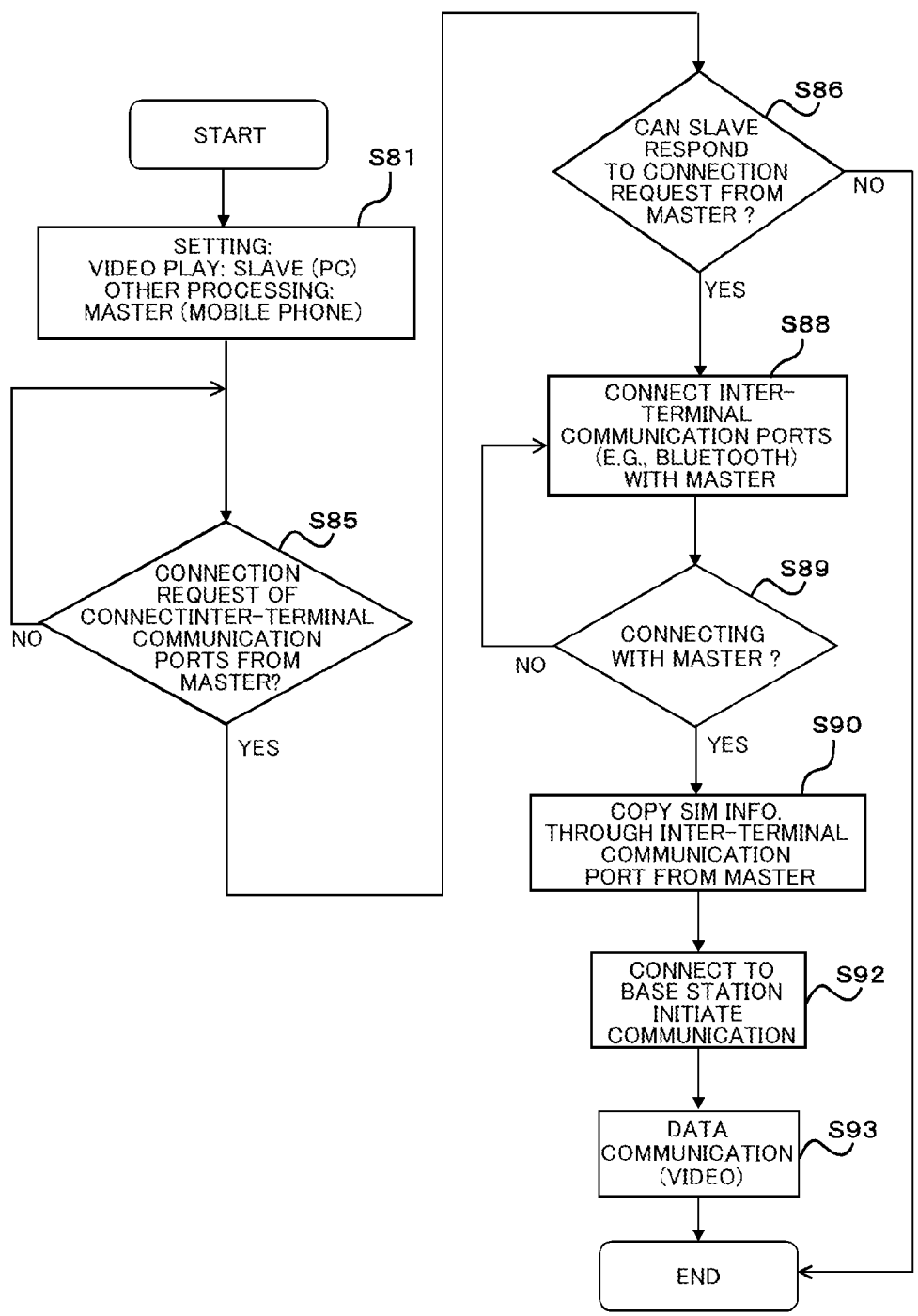
FIG. 9 is a flowchart illustrating the processing by the slave terminal for switching a terminal for receiving data between a master terminal and a slave terminal according to the type of data in an example of an embodiment.

Next, the processing in the slave terminal for switching a receiving terminal according to the type of data, in the system 1 as an example of an embodiment configured as described above, is depicted in FIG. 9.

This example also exemplifies the case where the master terminal is a mobile phone 10 and the slave terminal is a notebook PC 20.

Initially, in Step S 81, a user sets the notebook PC 20 such that processing for replaying a video is handled on the notebook PC 20, and processing on data in other types than video is handled on the mobile phone 10. The setting is made through a GUI for the setting in the notebook PC 20. The user also sets whether the SIM card 22 is deactivated or SIM information in the SIM card 22 is deleted for disabling the SIM card 22. The same setting is made both in the mobile phone 10 and in the PC 20, and the setting values may be stored in the memory 26 and/or the HDDs 29 in the mobile phone 20, for example.

Next in Step S 85, the inter-terminal communication controller 201 in the notebook PC 20 determines whether or not a connection request for the inter-terminal communication port 24 is received from the mobile phone 10 that is a master terminal. When the inter-terminal communication controller 201 does not receive any connection request for the inter-terminal communication port 24 from the mobile phone 10 (refer to the NO route from Step S 85), the processing is returned to Step S 85 where the inter-terminal communication controller 201 waits for receiving a connection request.

When the inter-terminal communication controller 201 receives a connection request for the inter-terminal communication port 24 from the mobile phone 10 (refer to the YES route from Step S 85), in Step S 86, the inter-terminal communication controller 201 in the notebook PC 20 sends a response indicating that the notebook PC 20 supports an inter-terminal connection. When the notebook PC 20 does not support an inter-terminal connection (refer to the NO route from Step S 86), the processing is terminated.

In contrast, the notebook PC 20 supports an inter-terminal connection in Step S 86 (refer to the YES route from Step S 86), in Step S 88, the inter-terminal communication controller 201 in the PC 20 makes a connection to the mobile phone 10 that is the master terminal, via the inter-terminal communication ports 14 and 24.

In Step S 89, the inter-terminal communication controller 201 in the PC 20 determines whether or not a connection between the inter-terminal communication ports 14 and 24 is established with the mobile phone 10. When a connection between the inter-terminal communication ports 14 and 24 is not established with the mobile phone 10 (refer to the NO route from Step S 89), the inter-terminal communication controller 201 returns to Step S 88 to retry to establish a connection between the inter-terminal communication ports 14 and 24.

In contrast, when a connection between the inter-terminal communication ports 14 and 24 can be established with the mobile phone 10 in Step S 89 (refer to the YES route from Step S 89), in Step S 90, the SIM information transmission and receiver 202 in the notebook PC 20 receives SIM information from the mobile phone 10, via the inter-terminal communication port 24. The SIM information transmission and receiver 202 in the notebook PC 20 writes the received SIM card information into the SIM card 22 in the notebook PC 20.

Next, in Step S 92, the communication migrator 203 in the notebook PC 20 activates the SIM card 22 to initiate a wireless WAN communication with the wireless WAN base station 40.

Next, in Step S 93, the data processor 204 in the notebook PC 20 receives a video from the wireless WAN base station 40 and replays the video, and the processing is terminated.

As described above, a connection with the wireless WAN base station 40 is initially made by master terminal. For switching a terminal used for communication, a SIM card in a destination terminal is activated and a SIM card in the source (original) terminal is deactivated. Thereby, a terminal used for communication can be switched.

In accordance with the embodiment set forth above, at least one of the following advantages are achieved:

(1) Since information in SIM cards is shared among multiple information terminals, communications can be switched without detaching and inserting a SIM card, which is cumbersome.

(2) The type of data is identified in an information terminal and a suitable information terminal for communication is automatically selected, which provides a system convenient for users.

(3) Large data is communicated in a network with a broader bandwidth, which increases the communication speed.

(4) Data with a higher processing load is processed on an information terminal having a higher processing performance, which increases the processing speed.

(5) Even though multiple information terminals are used, only a fee for a single SIM card is charged, which reduces the cost.

B. Miscellaneous

In the above-described embodiment, the master terminal is a mobile phone and the slave terminal is a PC. However, the master and slave terminals may be any electronic devices that have both wireless WAN communication and inter-terminal communication capabilities. The combination of terminals that are switched is not limited to the mobile phone 10 and the PC 20, and any combination of terminals can be possible as long as the terminals support wide area communications.

Figure 10:
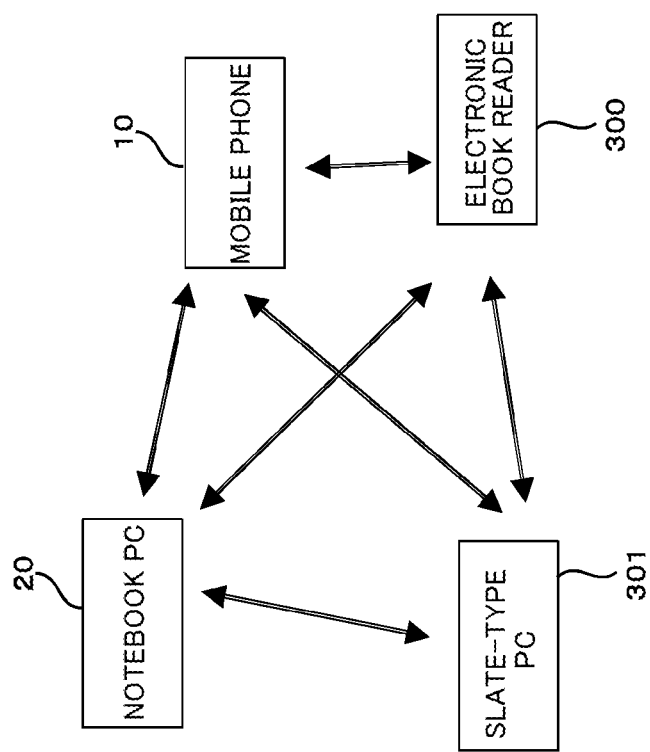
FIG. 10 is a schematic diagram illustrating various types of electronic devices which can be used for the master and/or slave terminals in an example of an embodiment.

An exemplary combination of terminals is depicted in FIG. 10.

In the example depicted in FIG. 10, the mobile phone 10, the notebook PC 20, an electronic book reader 300, and a slate-type PC 301 are illustrated.

A pair of master and slave terminals can be formed in any of the devices.

When terminals have different wireless communication bands (e.g., one terminal is a mobile phone 10 that performs a wireless communication according to the GSM and the other is a PC 20 that performs a wireless communication according to the LTE scheme), a service employing the difference in the band performances can be created.

Although there is a single slave terminal in the above-described embodiment, the number of the slave terminal is not limited to one and multiple slave terminals in the same or different type may be used.

In the above-described embodiment, the wireless WAN communication with the mobile phone (master terminal) is based on the GSM and the wireless WAN communication with the PC (slave terminal) is based on the LTE. However, the communication standards for the wireless WAN communications are not limited to those standards. Any communication standards that are supported by wireless WAN base stations can be employed.

Although Bluetooth® is used as the communication standard for inter-terminal communications in the above-described embodiment, any other communication standards for inter-terminal communications may be used. For example, wireless local area network (LAN) communications compliant with one of the IEEE802.11 standards may be used.

Further, communications are switched between the master and slave terminals according to the type of received data in the above-described embodiment. However, communications may be switched between the master and slave terminals according to the type of data, using a different condition. For example, when the size of received data exceeds a certain threshold, a communication may be switched from the master terminal to the slave terminal.

Further, communications are switched between the master and slave terminals when data is received in the above-described embodiment. However, communications may be switched between the master and slave terminals when data is sent or when two-way data communication is performed.

In accordance with the embodiment set forth above, wireless WAN communications can be performed on multiple information terminals with a single piece of SIM information. Hence, the following scenarios can be realized without paying duplicated basic fees to a communication operator. Conventionally, such scenarios use both SIM information for a mobile phone and SIM information for a wireless WAN communication card in a PC, and hence basic fees must be paid for the respective pieces of SIM information.

(a) Sound data and text data are received on a mobile phone 10, whereas video data and computationally intensive rich contents, such as map information, are received on a PC 20. For example, during a game, computationally intensive data, e.g., image data, are processed on the PC 20, while replaying sounds in the game are replayed on the mobile phone 10.

(b) Pictures are taken a mobile phone 10 with a camera and picture data is uploaded to a PC 20 via a wireless WAN base station, whereby using the PC 20 as a storage. In this scenario, immediately after a picture is taken, data of that picture is upload to the PC 20.

(c) When a particular keyword or data with a particular size is hit in a search made on the mobile phone 10, the result of the search is automatically sent and displayed to the PC 20.

(d) A presentation is created on the PC 20 during a business trip, and the data of that presentation is stored in a corporate server. The minor modification is made to the presentation using the mobile phone 10 on a commuter train from work, and the data of the modified presentation is updated to the corporate server.

Note that the present disclosure is not restricted to the embodiments described above, and various modifications may be made without departing from the spirit of the present disclosure.

For example, inter-terminal wireless communications are not limited to Bluetooth® and wireless LAN communications.

In accordance with the disclosed technique, electronic devices used for communication can be switched, by exchanging a single piece of user information between multiple electronic devices.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A system comprising:
a first electronic device; and
a second electronic device,
the first electronic device comprising:
a first communication unit that communicatively connects to a network using user information;
a second communication unit that communicatively connects to the second electronic device;
a determination unit that, upon obtaining data by the first communication unit, determines whether or not the data is to be obtained by the second electronic device according to a type of the data that is being downloaded from the network;
a user information transmitter that, when the determination unit determines that the data is to be obtained by the second electronic device, sends the user information to the second electronic device via the second communication unit; and
a migration unit that blocks the first communication unit from communicating with the network, and causes the second electronic device to obtain the data through the network using the user information,
the second electronic device comprising:
a third communication unit that communicatively connects to the network using the user information;
a fourth communication unit that communicatively connects to the first electronic device;
a user information receiver that receives the user information sent by the user information transmitter; and
a reception processor that obtains the data through the network, via the third communication unit, using the user information.

2. The system according to claim 1, wherein the first electronic device comprises a first storage that stores the user information, and
the migration unit invalidates the user information in the first storage when migration unit causes the second electronic device to obtain the data using the user information.

3. The system according to claim 1, further comprising a second storage that stores the user information received by the second electronic device,
wherein, after the data is obtained by the reception processor, the first electronic device is notified and the user information in the second storage is invalidated.

4. The system according to claim 1, wherein the second communication unit and the fourth communication unit perform an inter-terminal wireless communication.

5. The system according to claim 1, wherein a communication bandwidth of the first communication unit to the network is broader than a communication bandwidth of the third communication unit to the network.

6. A first electronic device comprising:
a first communication unit that communicatively connects to a network using user information;

a second communication unit that communicatively connects to a second electronic device, wherein the second electronic device is communicatively coupled to the network;

a determination unit that, upon obtaining data by the first communication unit, determines whether or not the data is to be obtained by the second electronic device according to a type of the data that is being downloaded from the network;

a user information transmitter that, when the determination unit determines that the data is to be obtained by the second electronic device, sends the user information to the second electronic device via the second communication unit; and a migration unit that blocks the first communication unit from communicating with the network, and causes the second electronic device to obtain the data through the network using the user information.

7. The electronic device according to claim 6, further comprising a first storage that stores the user information,
wherein the migration unit invalidates the user information in the first storage when migration unit causes the second electronic device to obtain the data using the user information.

8. The electronic device according to claim 6, wherein the second communication unit performs an inter-terminal wireless communication.

9. The electronic device according to claim 6, wherein a communication bandwidth of the first communication unit to the network is broader than a communication bandwidth between the second communication unit and the network.

10. A method of communicating in a system comprising a first electronic device and a second electronic device, the method comprising:
obtaining data by a first communication unit of the first electronic device from a network using user information;
upon obtaining the data, determining whether or not the data is to be received by the second electronic device according to a type of the data that is being downloaded from the network;
in response to determining that the data is to be obtained by the second electronic device, sending the user information from the first electronic device to the second electronic device; and
blocking the first communication unit of the first electronic device from communicating with the network, and causing the second electronic device to obtain the data through the network using the user information.

11. The method according to claim 10, further comprising: invalidating the user information in the first electronic device when migration unit causes the second electronic device to obtain the data using the user information.

12. The method according to claim 10, further comprising: wherein, after the data is obtained, notifying the first electronic device, and invalidating the user information in the second electronic device.

13. The method according to claim 10, further comprising: sending the user information from the first electronic device to the second electronic device via an inter-terminal wireless communication.

14. The method according to claim 10, wherein a communication bandwidth between the second electronic device and the network is broader than a communication bandwidth between the first electronic device and the network.

15. A non-transitory computer-readable storage medium having a communication program stored therein, the communication program, when executed by a first electronic device, causing the first electronic device to:
communicatively connect to a network using user information;
upon obtaining data through the network, determine whether or not the data is to be received by a second electronic device according to a type of the data that is being downloaded from the network, wherein the second electronic device is communicatively coupled to the network;
in response to it being determined that the data is to be obtained by the second electronic device, send the user information to the second electronic device; and
block the electronic device from communicating with the network, and causes the second electronic device to obtain the data through the network using the user information.

* * * * *